(12) United States Patent
Chan et al.

(10) Patent No.: US 7,340,771 B2
(45) Date of Patent: Mar. 4, 2008

(54) SYSTEM AND METHOD FOR DYNAMICALLY CREATING AT LEAST ONE PINHOLE IN A FIREWALL

(75) Inventors: Tat Keung Chan, Wakefield, MA (US); Ram Gopal Lakshmi Narayanan, Sr., Woburn, MA (US)

(73) Assignee: Nokia Corporation, Espoo (FI)

( * ) Notice: Subject to any disclaimer, the term of this patent is extended or adjusted under 35 U.S.C. 154(b) by 689 days.

(21) Appl. No.: 10/461,312

(22) Filed: Jun. 13, 2003

(65) Prior Publication Data

US 2004/0255156 A1  Dec. 16, 2004

(51) Int. Cl.
*H04L 9/00*      (2006.01)
*H04L 29/26*     (2006.01)
*H04L 29/00*     (2006.01)

(52) U.S. Cl. .............................. 726/12; 726/3; 726/11; 726/13; 726/15; 726/2; 713/153; 713/154; 709/225; 709/227; 709/238

(58) Field of Classification Search ..................... None
See application file for complete search history.

(56) References Cited

U.S. PATENT DOCUMENTS

| 2002/0124189 | A1* | 9/2002 | Bakke | 713/201 |
| 2004/0034793 | A1* | 2/2004 | Yuan | 713/200 |
| 2004/0128554 | A1* | 7/2004 | Maher et al. | 713/201 |

FOREIGN PATENT DOCUMENTS

WO    WO 02/103981 A2    12/2002

OTHER PUBLICATIONS

P. Srisuresh, J. Kuthan, J. Rosenberg, A. Molitor, A.Rayhan; *Middlebox communication architecture and framework*; Aug. 2002; 35 pages; Network Working Group; The Internet Society.
Victor Paulsamy, Samir Chatterjee; *Network Convergence and the NAT/Firewall Problems*; 2003; 10 pages; Proceedings of the 36th Hawaii International Conference on System Sciences (HICSS '03).; IEEE Computer Society; 0-7695-1874-5/03.

(Continued)

*Primary Examiner*—Syed A. Zia
*Assistant Examiner*—Saoussen Besrour
(74) *Attorney, Agent, or Firm*—Alston & Bird LLP

(57) ABSTRACT

A communications system and method for dynamically creating at least one pinhole in a firewall are provided. The communications system includes a protected node capable of initiating a communication session with an outside node. In this regard, the protected node is capable of receiving flow parameters regarding the communication session as the communication session is setup. The system also includes a firewall disposed along a communications path between the protected node and the outside node. The protected node is capable of sending at least a portion of the flow parameters to a firewall-controlled proxy, which in turn, is capable of forwarding the portion of the flow parameters to the firewall. Thereafter, the firewall is capable of creating at least one pinhole based upon the portion of the flow parameters to thereby permit the transmission of information between the outside node and the protected node during the communication session.

23 Claims, 5 Drawing Sheets

OTHER PUBLICATIONS

K. Umschaden, J. Stadler, I. Miladinovic; *End-to-end Security for Firewall/NAT Traversal within the Session Initiation Protocol (SIP)*; May 2003; 38 pages; Internet Engineering Task Force.

M. Stiemerling, J. Quittek; *Middlebox Configuration Protocol Design*; Jul. 2002; pp. 222-226; IEEE; 0-7803-7658-07/02.

Paul Henry; *An Examination of Firewall Architectures—A CiberGuard Corporation White Paper*; 2001; 16 pages; CyberGuard Corporation.

M. Handley, V. Jacobson; *SDP: Session Description Protocol*; 1998; 40 pages; Available at <http://www.ietf.org/rfc/rfc2327.txt?number=2327> (visited Apr. 9, 2003).

D. Yon; *Connection-Oriented Media Transport in SDP* <draft-ietf-mmusic-sdp-comedia-01.txt>; 2001; 11 pages; Available at <http://www.dmn.tzi.org/ietf/mmusic/52/id/draft-ietf-mmusic.sdp-comedia-01.txt> (visited May 8, 2003).

* cited by examiner

SYSTEM AND METHOD FOR DYNAMICALLY CREATING AT LEAST ONE PINHOLE IN A FIREWALL

FIELD OF THE INVENTION

The present invention generally relates to systems and methods for communicating through firewalls and, more particularly, relates to systems and methods for dynamically creating pinholes in firewalls to thereby permit communications to pass through the firewalls.

BACKGROUND OF THE INVENTION

As well known, firewalls in network communications systems guard a trusted network from an outside network, such as the Internet. In this regard, firewalls typically build the entire trust at the perimeter of the trusted network, however, the locations and identifications of the firewalls are typically not revealed to the users of the trusted network. In operation, firewalls act on the incoming traffic to the trusted network and determine whether to allow the incoming traffic to pass to a destination within the trusted network. Typically, to determine whether to allow the incoming traffic to pass into the trusted network, most firewalls maintain an access control list (ACL) that includes parameters for allowing traffic to pass into the network. Generally, firewalls operate according to a default policy of prohibiting incoming traffic from passing into the trusted network, unless the incoming traffic meets the parameters configured in the ACL.

Many access networks have a content distribution and content caching framework to provide proxy services for low bandwidth devices. In such cases, the user of the network needs to describe the capabilities to its local proxy. From the user's perspective, however, the client application is merely downloading content from the local proxy/cache. In such instances, creating an opening in the firewall, often referred to as a pinhole, is not typically a concern for the client. In other instances, however, pinhole creation is desired for setting up communication sessions. For example, a user in the trusted network may desire to have a pinhole in the firewall to conduct a real-time audio or video conversation where the use of proxy services would add additional jitter and delay in extra processing. As another example, a user in a smaller, unmanaged network that does not provide local proxy services may desire to have a pinhole in the firewall. Such unmanaged networks typically have an Authentication, Authorization and Accounting (AAA) and/or firewall to authorize the users and to protect the users from outside networks.

Conventionally, firewalls are configured manually, and may be configured to include one or more pinholes. Manually configuring such pinholes, however, greatly restricts the flexibility of communication services that can be offered by the users of the trusted network and other users who communicate with users of the trusted network. In this regard, the pinholes have to be manually created for a particular session in advance of the session, such as by an administrator. For modem communication protocols, very often the ports used are dynamically allocated during run time and not determined in advance. In these scenarios, the conventional, static configuration of firewalls typically cannot provide the necessary services.

SUMMARY OF THE INVENTION

In light of the foregoing background, embodiments of the present invention provide systems and methods for dynamically creating a pinhole in a firewall. According to embodiments of the present invention, an end point, or protected user node, can cause a firewall protecting the user node to dynamically create a pinhole for communication between the protected user node and an outside node. In this regard, creation of the pinhole can be initiated by the end user as needed for a communication session with the outside node. Advantageously, the pinhole can be created after initiating the communication session with the outside node, but before transmission of information, such as media content, between the protected node and outside node. Also, embodiments of the present invention provide for the secure creation of pinholes such that only an authorized pinhole is created to thereby allow authorized information to pass through the firewall via the pinhole.

According to one aspect of the present invention, a communications system is provided. The system includes a protected node capable of initiating a communication session with an outside node. For example, the protected node can send a session initiation protocol (SIP) INVITE request message to the outside node to thereby initiate the communication session, and thereafter receive a SIP 200OK response message from the outside node. In this regard, the protected node is capable of receiving flow parameters, such as an address and at least one port associated with the outside node, regarding the communication session as the communication session is setup. The system also includes a firewall disposed along a communications path between the protected node and the outside node. In this regard, the firewall is capable of controlling transmission of information between the outside node and the protected node during the communication session.

The communications system can also include a firewall-controlled proxy disposed between the protected node and the firewall, where the firewall-controlled proxy includes an address associated with the firewall. In this regard, the protected node can send at least a portion of the flow parameters to the firewall-controlled proxy. Thereafter, the firewall-controlled proxy can send the portion of the flow parameters to the firewall based upon the address of the firewall such that the firewall can create at least one pinhole based upon the portion of the flow parameters. By creating the pinholes, the firewall can be configured to permit the transmission of information between the outside node and the protected node during the communication session. The protected node can be capable of encrypting at least a portion of the flow parameters, and thereafter sending the encrypted portion of the flow parameters to the firewall-controlled proxy. The firewall-controlled proxy can then be capable of decrypting the portion of the flow parameters to thereby validate the portion of the flow parameters. Additionally, the protected node can be capable of creating a session identifier as the communication session is setup. In this regard, the firewall-controlled proxy can be capable of comparing at least a portion of the flow parameters with the session identifier to thereby validate the communication session before sending the portion of the flow parameters to the firewall.

A system and method for dynamically creating a pinhole in a firewall are also provided. Therefore, embodiments of the present invention provide systems and methods for dynamically creating a pinhole in a firewall. According to embodiments of the present invention, the protected user node can cause the firewall protecting the user node to dynamically create a pinhole for communication between the protected user node and an outside node. The systems and methods of embodiments of the present invention provide for dynamically creating the pinhole after initiation of the communication session between the user nodes. Thus, creation of the pinhole can be initiated by the end user as needed for a communication session with the outside node. Advantageously, embodiments of the present invention further provide for the secure creation of pinholes, such as by verifying the flow parameters and/or the communication session. In this regard, embodiments of the present invention are capable of ensuring that only an authorized pinhole is created to thereby allow authorized information to pass through the firewall via the pinhole. As such, the systems and methods of embodiments of the present invention solve the problems identified by prior techniques and provide additional advantages.

BRIEF DESCRIPTION OF THE DRAWINGS

Figure 1:
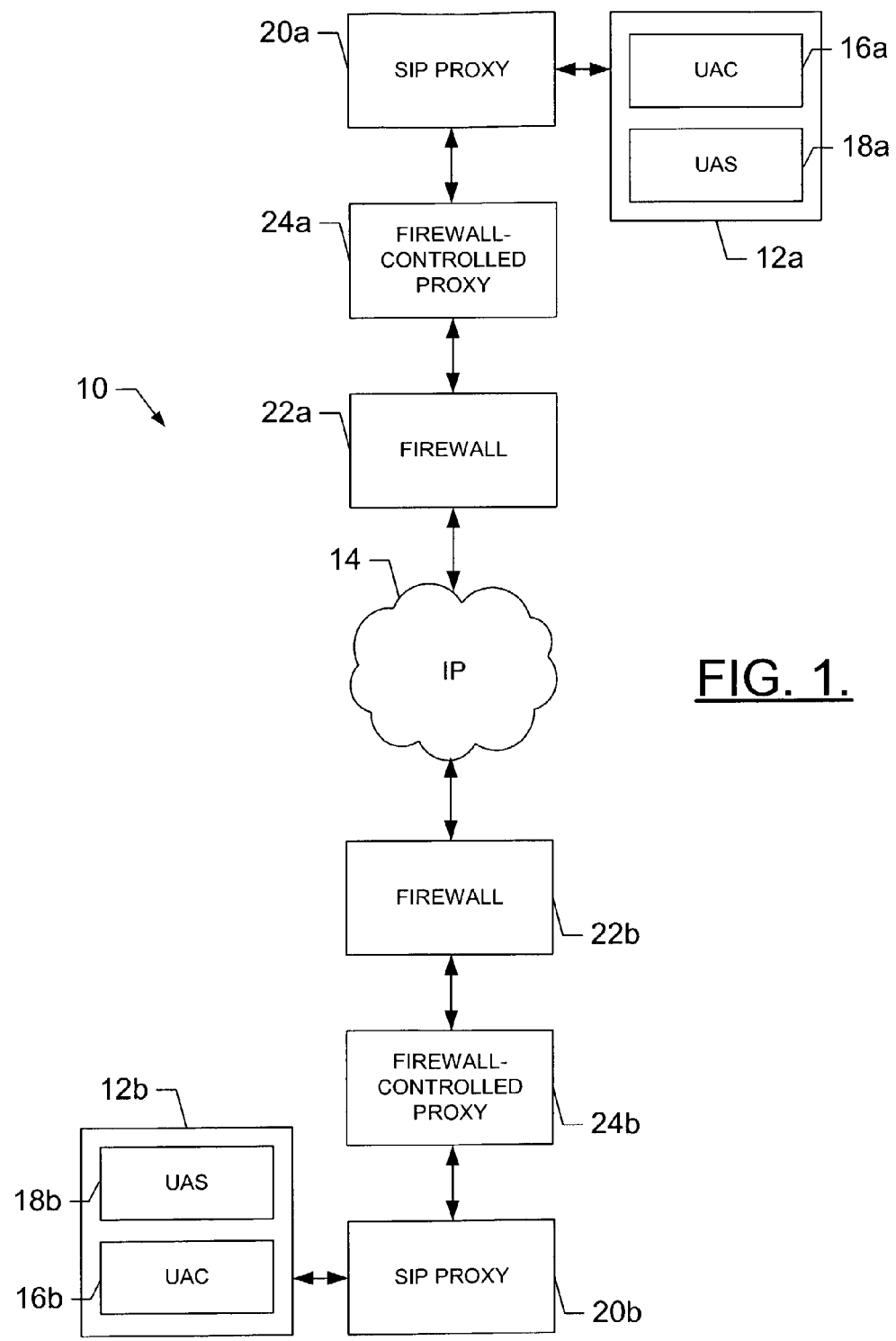
Figure 2:
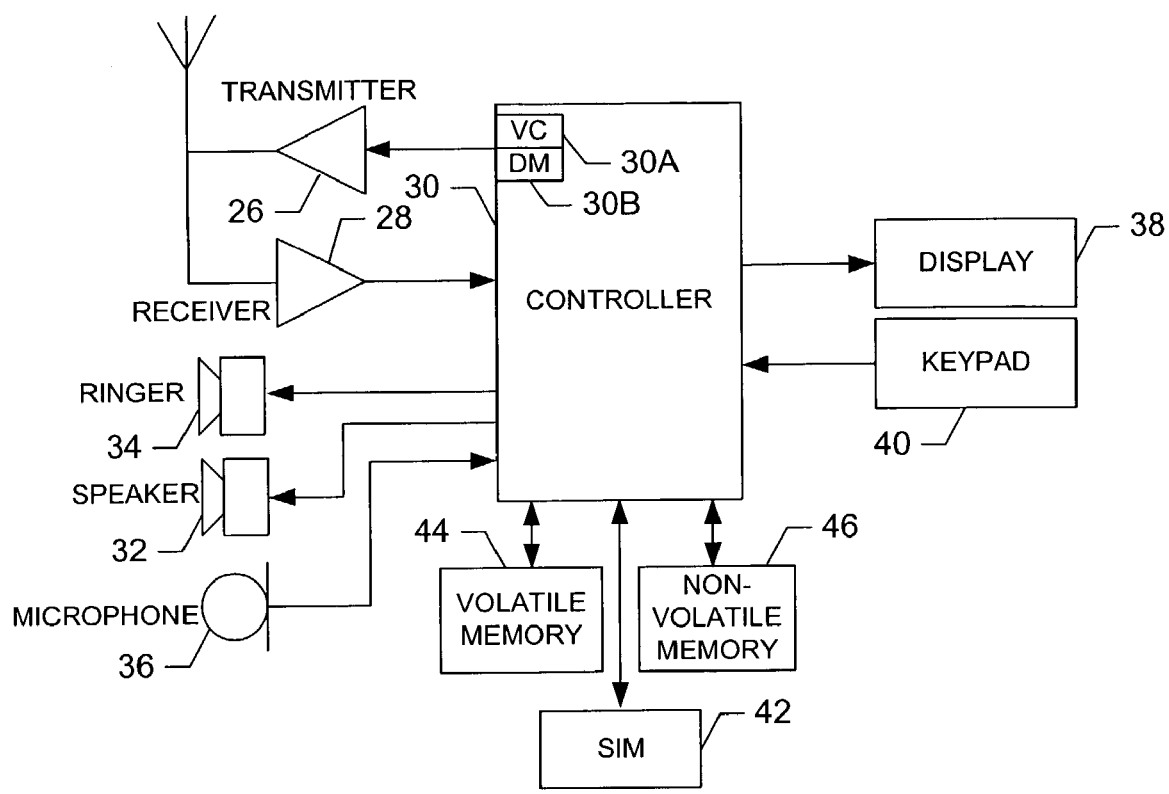
Figure 3:
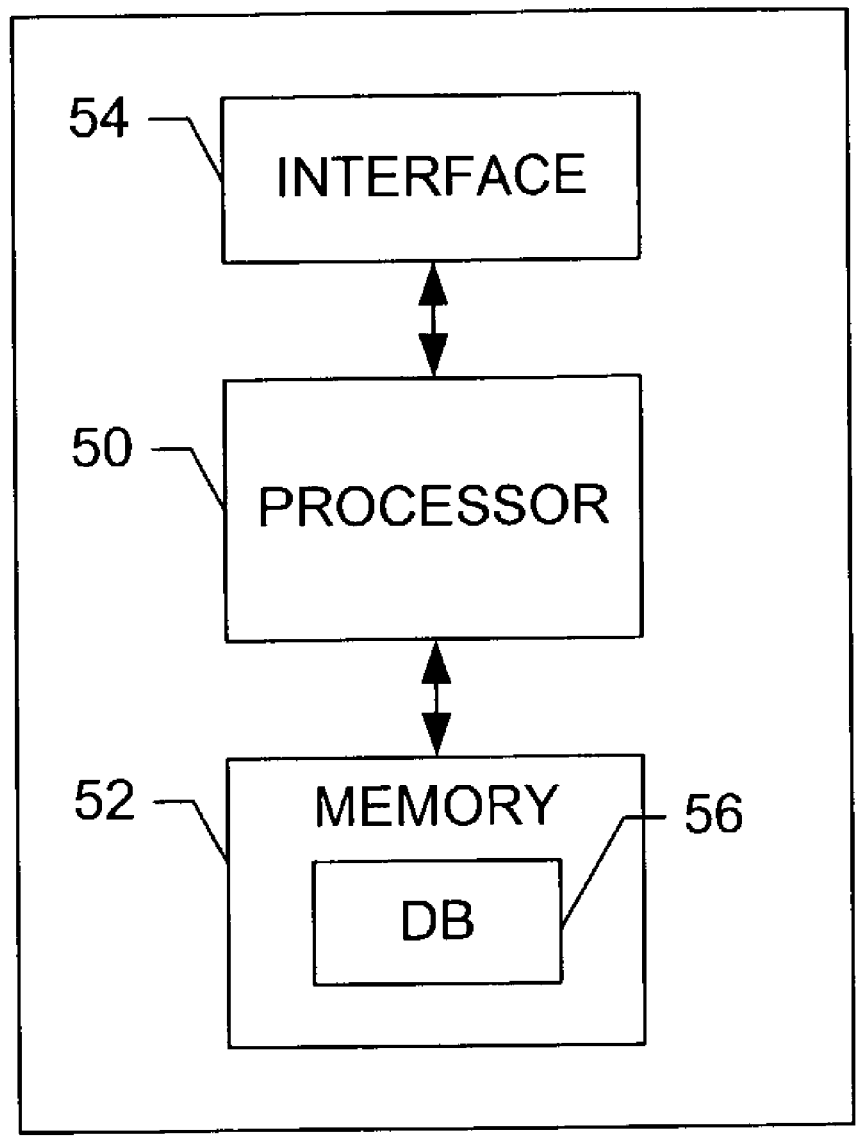
Figure 4:
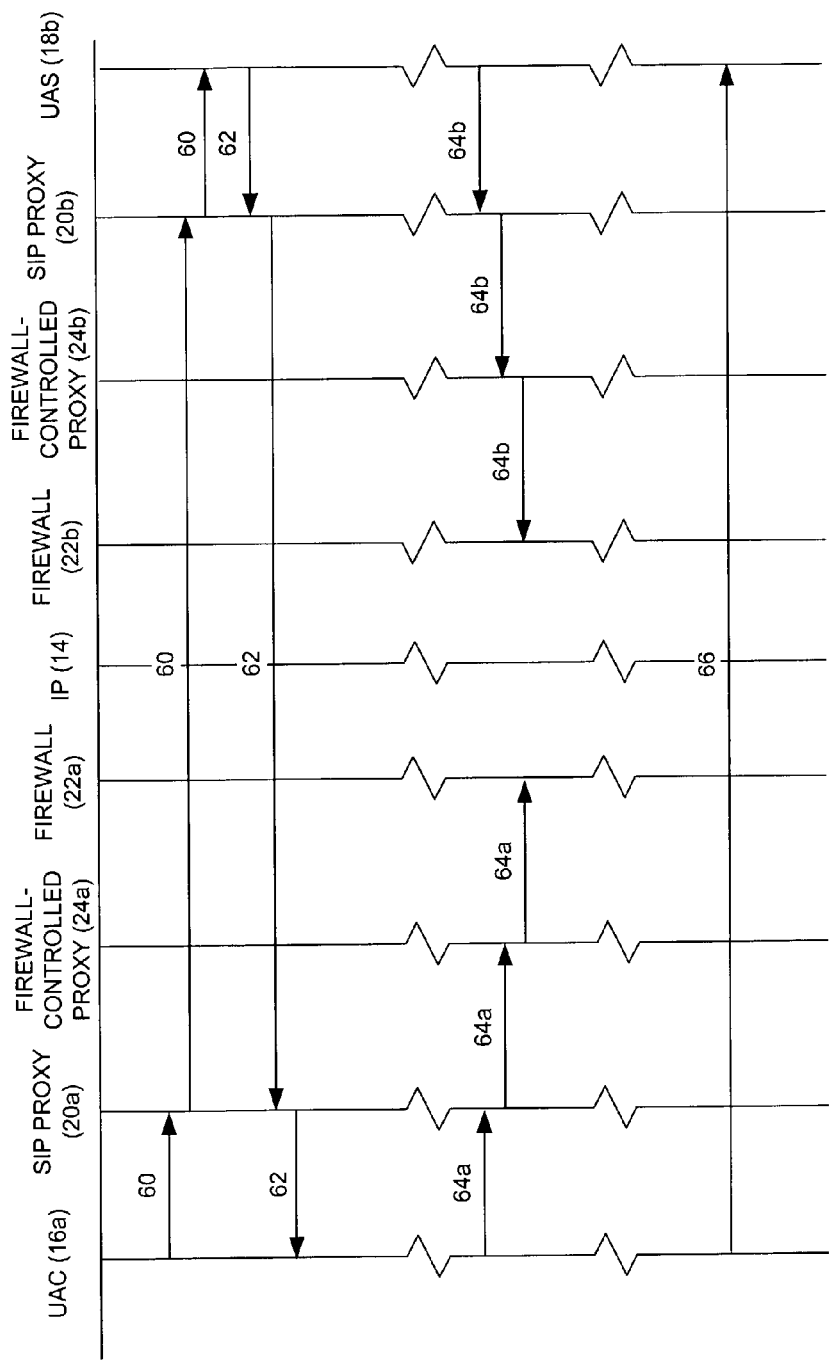
Figure 5A:
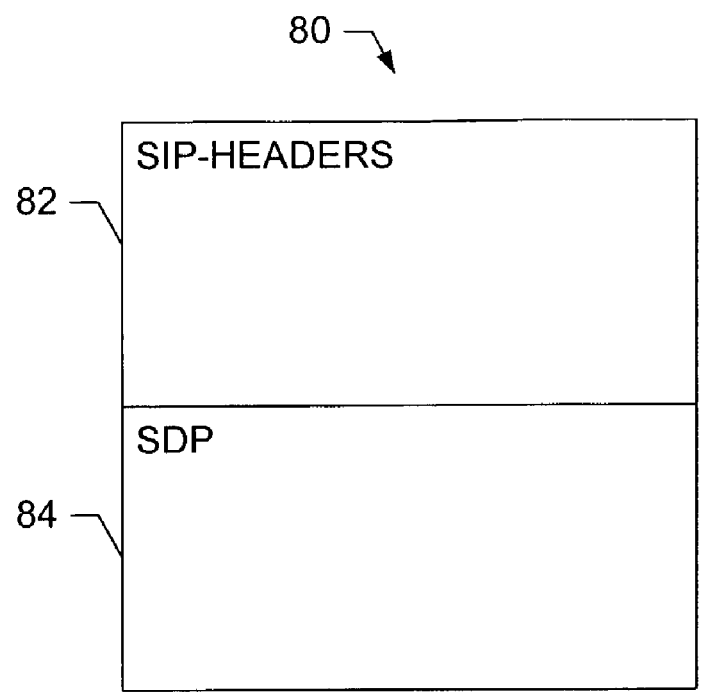
Figure 5B:
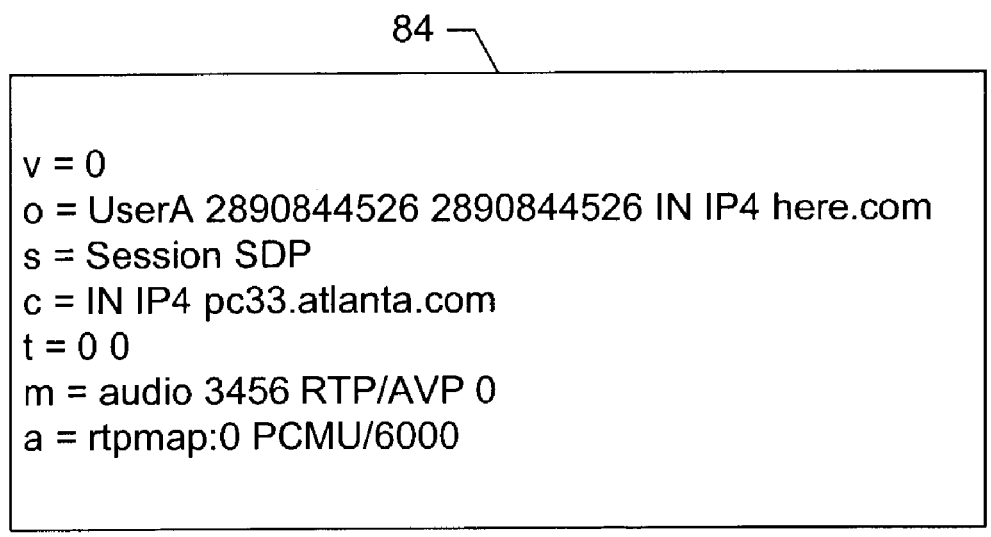

Having thus described the invention in general terms, reference will now be made to the accompanying drawings, which are not necessarily drawn to scale, and wherein:

FIG. 1 is a schematic block diagram of a system that supports the dynamic creation of pinholes according to embodiments of the present invention;

FIG. 2 is a schematic block diagram of a mobile station that may act as a user node according to embodiments of the present invention;

FIG. 3 shows a functional diagram of a server, which is representative of a SIP proxy, a firewall or a firewall-controlled proxy, according to one embodiment of the present invention;

FIG. 4 shows message flows between entities in a method of dynamically creating pinholes in firewalls according to one embodiment of the present invention; and FIGS. 5A and 5B illustrate a SIP message format and an example of the message body of a SIP message according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

An example of a system 10 in the network-establishing mode is illustrated in FIG. 1. In accordance with embodiments of the present invention, the system 10 provides a session initiation protocol (SIP) framework. According to SIP, a user node uses the Session Initiation Protocol (SIP) to initiate a session. The SIP protocol is a text-based application-layer protocol that works above the transport layer in the TCP/IP (Transport Control Protocol/Internet Protocol) stack. SIP can use any transport protocol, including TCP (Transport Control Protocol) and UDP (User Datagram Protocol) as its transport protocol. In addition, SIP can also work with ATM AAL5 (Asynchronous Transfer Mode ATM Adaption Layer 5), IPX (Internet Packet exchange), frame relay or X.25 transport protocols.

The system generally includes a pair of user nodes 12a and 12b, and an IP communications network 14 through which the end nodes communicate. In accordance with SIP, the user nodes are end systems that act on behalf of someone desiring to participate in a call or session. In general, the user nodes contain both a protocol client (a user agent client—UAC 16a and 16b, respectively), which initiates a call, and a protocol server (user agent server—UAS 18a and 18b, respectively), which responds to a call. Also in accordance with SIP, the end nodes may each register with corresponding local SIP proxies 20a and 20b, respectively, that each receive requests, determine where to send the requests, and then forward the requests.

As discussed in greater detail below, the system 10 also includes at least one firewall, but more typically, includes a pair of firewalls 22a and 22b, where each firewall is disposed along the communication path between a respective user node 12a and 12b and the communications network 14. It should be understood that the system can include any number of firewalls, including more than a pair of firewalls, without departing from the spirit and scope of the present invention. As well known to those skilled in the art, the firewalls receive the data intended for a respective user node, and thereafter examine the data to determine whether to forward the data to the respective user node. As such, the firewalls are capable of protecting the respective user nodes from unauthorized information, such as corrupt data, resource depleting data and the like.

In addition to the firewalls 22a and 22b, the system 10 includes a firewall-controlled proxy in electrical communication with each firewall and a respective user node, between the firewall and the respective user node. As shown in FIG. 1, then, the system may include a pair of firewall-controlled proxies 24a and 24b in electrical communication the firewalls and the respective user nodes 12a, 12b. The firewall-controlled proxies are capable of receiving communication flow parameters from a respective user node, and thereafter passing such parameters to the firewall. The firewall can then dynamically create one or more pinholes, or one or more openings in the firewall, to allow the communication session to proceed through the pinholes without interference from the firewall.

Referring now to FIG. 2, a functional diagram of a mobile station is shown that may act as a user node 12a, 12b according to embodiments of the invention. It should be understood, that the mobile station illustrated and hereinafter described is merely illustrative of one type of mobile station that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers and other types of voice and text communications systems, can readily employ the present invention. In addition, while several embodiments of the system and method of the present invention include a user node comprising a mobile station, the user node need not comprise a mobile station. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The mobile station includes a transmitter 26, a receiver 28, and a controller 30 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first, second and/or third-generation communication protocols or the like. For example, the mobile station may be capable of operating in accordance with second-generation (2G) wireless communication protocols IS-136 (TDMA), GSM, and IS-95 (CDMA). Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 30 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 30A, and may include an internal data modem (DM) 30B. Further, the controller may include the functionally to operate one or more software programs, which may be stored in memory. For example, the controller may be capable of operating a connectivity program, such as a conventional Web browser. The connectivity program may then allow the mobile station to transmit and receive Web content, such as according to the Wireless Application Protocol (WAP), for example.

The mobile station also comprises a user interface including a conventional earphone or speaker 32, a ringer 34, a microphone 36, a display 38, and a user input interface, all of which are coupled to the controller 30. The user input interface, which allows the mobile station to receive data, can comprise any of a number of devices allowing the mobile station to receive data, such as a keypad 40, a touch display (not shown) or other input device. In embodiments including a keypad, the keypad includes the conventional numeric (0-9) and related keys (#, *), and other keys used for operating the mobile station.

The mobile station can also include memory, such as a subscriber identity module (SIM) 42, a removable user identity module (R-UIM) or the like, which typically stores information elements related to a mobile subscriber. In addition to the SIM, the mobile station can include other memory. In this regard, the mobile station can include volatile memory 44, such as volatile Random Access Memory (RAM) including a cache area for the temporary storage of data. The mobile station can also include other non-volatile memory 46, which can be embedded and/or may be removable. The non-volatile memory can additionally or alternatively comprise an EEPROM, flash memory or the like. The memories can store any of a number of pieces of information, and data, used by the mobile station to implement the functions of the mobile station. For example, the memories can store an identifier, such as an international mobile equipment identification (IMEI) code, capable of uniquely identifying the mobile station, such as to a mobile switching center (MSC). Also, for example, the memories can store instructions for creating messages related to embodiments of the present invention, such as INVITE and FLOW PARAMETERS messages.

Referring now to FIG. 3, a functional diagram of an entity that may act as a SIP proxy 20a, 20b, a firewall 22a, 22b or a firewall-controlled proxy 24a, 24b. Although shown as separate entities, in some embodiments, a single entity may support a logically separate, but co-located, SIP proxy with a respective firewall-controlled proxy and/or firewall. The entity acting as the SIP proxy, firewall or firewall-controlled proxy generally includes a processor 50 connected to a memory 52 and an interface 54. The memory typically includes instructions for the processor to perform steps in accordance with operation of the SIP proxy, firewall or firewall-controlled proxy in accordance with embodiments of the present invention. The memory can store any of a number of different pieces of information necessary for operation of the respective device. For example, as a firewall, the memory may store a database (DB) 56 containing access control list (ACL) information for specifying a number of parameters, business rules or the like, by which data may pass the firewall. As a SIP proxy, for example, the memory may store a local database containing session identifiers of ongoing sessions for a respective user node 12a, 12b. And as a firewall-controlled proxy, for example, the memory may store a local database containing a list of session identifiers for active communication sessions between a number of user nodes (including user nodes 12a and 12b).

As shown in FIG. 4, a method is shown for dynamically creating at least one pinhole in a firewall in conjunction with initiating a communication session between one user node 12a operating as a caller, and another user node 12b operating as a callee, according to one embodiment of the present invention. For example, in one typical scenario of setting up a voice over IP (VoIP) communication session, each firewall may be directed to create pair of pinholes, one for a Real-Time Transport Protocol (RTP) session (i.e., for actual media flow), and one for a Real-Time Control Protocol (RTCP) session (i.e., for managing and controlling the RTP session.

According to one typical scenario, the caller, from organization A, desires to set up a communication session with the callee from organization B. However, both organizations have installed firewalls for the protection of their corresponding Intranets. In this regard, user node 12a comprises the protected node for firewall 22a and the outside node for firewall 22b. Similarly, user node 12b comprises the protected node for firewall 22b and the outside node for firewall 22a. In accordance with embodiments of the present invention, then, the caller and callee can direct their respective firewalls to create pinholes, such as utilizing a respective firewall-controlled proxy, as described below. By creating such pinholes, the firewall can permit information to pass between the caller and callee during a communication session.

As shown, the UAC 16a of the callee (i.e., user node 12a) initiates a communication session with the caller (i.e., user node 12b) by sending an INVITE message 60 to the callee, or more particularly the UAS 18b, via SIP proxies 20a, 20b. The INVITE message, in this regard, expresses the callee's intention to set up a communication session with the caller. In response to the INVITE message, the UAS may confirm receipt of the INVITE message and accept the communication session by sending a '200 OK' message 62 back to the callee UAC via the SIP proxies. Thereafter, although not shown, the UAC may transmit an acknowledgement ACK message to the UAS.

As shown, the INVITE and 200 OK messages 60, 62 pass through the firewalls 22a, 22b without the firewalls examining the content of the respective messages. In this regard, as will be appreciated by those skilled in the art, the firewalls are typically configured to allow signaling messages, such as the INVITE and 200 OK messages (as well as the ACK message), to pass to/from the SIP proxies 20a, 20b. In this regard, signaling messages typically utilize well-known ports (e.g., SIP utilizes port 5060 for SIP services). In contrast, media traffic typically utilize dynamic ports (e.g., Real Time Protocol (RTP) utilizes User Datagram Protocol (UDP) transport, with the port being dynamically allocated). The firewalls, then, are typically configured to allow the passage of signaling messages utilizing a number of given ports, and block the passage of media traffic other ports by default (unless otherwise preconfigured to allow the passage of media traffic utilizing one or more other ports).

During initiation of the communication session, information about the communication session being initiated is exchanged between the user nodes 12a, 12b. According to SIP, such information is exchanged in the payloads of the INVITE request and 200 OK response messages 60, 62 exchanged between the user nodes. In this regard, FIG. 5 shows the basic SIP message structure, such as the message structure of the INVITE and 200 OK messages. Generally, a SIP message 80 comprises SIP header fields 82, and a message body 84. For setting up of multimedia communication session purposes, the message body is typically written in accordance with the Session Description Protocol (SDP). The SIP header fields contain information about the sender and the recipient of the message such as address information and other general information familiar to those skilled in the art.

The message body 84 typically comprises information concerning those media streams to be transmitted between the user nodes 12a, 12b during the session, such as the IP addresses and ports for the media session, media types (audio, video, etc) and supported codec. Each media stream is typically defined according to the SDP with the aid of one media line, or m-line. Each media stream may be even more specifically defined with the aid of one or more attribute lines, or a-lines, following the m-line. As an example, consider the message body shown in FIG. 5B. Of the SDP parameters shown, the message body includes an origin line (o-line), a subject line (s-line) and a time line (t-line), none of which are utilized according to SIP.

The message body 84 also includes a connection line, or c-line, that indicates the connection being utilized by the user node 12a, 12b sending the SIP message. As shown, for example, the c-line indicates an Internet connection (IN) utilizing an IP version 4 network protocol (IPv4) to the address "pcc.Atlanta.com." The c-line indicates that the user node expects the other party to establish the media session to the IPv4 address at "pcc.Atlanta.com." The message body further includes an m-line, as indicated above. For example, as shown, the m-line indicates an audio media type to port number 49127 of the user node sending the SIP message, indicates that RTP/AVP (Real-Time Transport Protocol/Audio Video Protocol) is the transport protocol the user node expects the other party uses to send the media, and the number 0 indicates a particular profile in RTP/AVP. As also indicated above, the message body includes an a-line that, in the illustrated example of FIG. 5B, references the attributes (rtpmap) for RTP/AVP profile 0, including the codec (PCMU-PCM μ-law) and sampling rate (8000 Hz).

Generally, then, the message body 84 includes an SDP payload that contains necessary flow parameters regarding the media session to be set up, namely, the IP address and port. And as described in greater detail below, such information can advantageously be transmitted to the firewall in accordance with embodiments of the present invention to thereby dynamically create a pinhole for media transmission between the user nodes 12a, 12b. More particularly, after initiating communication between the user nodes, both user nodes possess the relevant information regarding the media session to be set up. As described above, the relevant information includes the media type(s) (e.g., video/audio), parameters for each media flow (e.g., codec), and destination IP address and port for each media flow. The destination IP address and port (together with the source IP address and port) provide the necessary information for pinhole creation at the respective firewalls 22a, 22b. No current technique exists, however, for either user node to notify its respective firewall about this flow information when the respective user node has no knowledge of the existence or location of the firewall. In this regard, the firewalls are typically not visible to the respective user nodes, i.e., neither user node possesses the IP address of a respective firewall and, therefore, cannot send a message directly to the respective firewall. Furthermore, if signaling information, such as the SDP message body 84, is encrypted end-to-end between the user nodes, the intermediate SIP proxies 20a, 20b cannot determine the flow information being negotiated by the endpoints.

As such, according to embodiments of the present invention, the user nodes 12a, 12b can advantageously initiate a request for the creation of pinholes in the respective firewalls 22a, 22b as the user nodes may be the only entities who know the flow parameters. Further, the user nodes may be the only entities capable of retrieving the flow parameters as the flow parameters may be encrypted between the user nodes, such as in accordance with SIP. More particularly, after initiating the communication session between the user nodes, each user node sends a FLOW PARAMETERS message 64a, 64b to a respective firewall controlled proxy 24a, 24b via a respective SIP proxy 20a, 20b. The FLOW PARAMETERS message can be prepared by the respective user node in any of a number of different formats, such as according to the Internet Control Message Protocol (ICMP).

The payload of the FLOW PARAMETERS message includes the flow parameters necessary for the creation of a pinhole in the respective firewall. For example, the FLOW PARAMETERS message may contain a source (i.e., user node 12a) IP address and port number, destination (i.e., user node 12b) IP address and port number, and may also include the transport mechanism, if so desired. For example, presuming the SDP message body 84 in FIG. 5B comprises the body of an INVITE message transmitted from user node 12a. In such an instance, the payload of the FLOW PARAMETERS message sent from user node 12a may contain the destination port number 49127 of user node 12a, and the origin IP address (i.e., IP address of user node 12b) of the media flow pc33.Atlanta.com, and may also include the transport mechanism RTP/AVP. In this regard, user node 12a is indicating that media information will be received at port 49127 of user node 12a from pc33.Atlanta.com, and that the media information will be transported according to RTP/AVP.

The firewall-controlled proxies 24a, 24b receive the respective FLOW PARAMETERS messages 64a, 64b, and thereafter communicate the respective FLOW PARAM- ETERS messages to the respective firewalls 22a, 22b. In this regard, the firewall-controlled proxies, unlike the user nodes, possess the addresses (e.g., IP addresses) of the respective firewalls. By communicating the respective FLOW PARAMETERS messages to the respective firewalls, the firewall-controlled proxies are capable of directing the firewalls to create pinholes based upon the information included within the payloads of the respective FLOW PARAMETERS messages. The firewall-controlled proxies can communicate with the respective firewalls according to any of a number of different techniques, such as according to the Middlebox communication protocol (midcom protocol), currently being standardized by the Internet Engineering Task Force (IETF). One candidate of the midcom protocol is the Simple Network Management Protocol (SNMP).

As will be appreciated, the user nodes 12a, 12b are typically configured for secure communication with respective SIP proxies 20a, 20b. For example, in the case of a user node comprising a mobile station, an authentication and key agreement procedure is typically conducted between the mobile station, the local proxy, and the home network when the mobile station powers on. In addition to the network authenticating the user (or both parties mutually authenticating one another), a shared session key may be created during the power on procedure. The shared session key can then be utilized to encrypt messages, such as SIP messages, during use of the mobile station. In this regard, the FLOW PARAMETERS messages 64a, 64b can be encrypted using the shared session key. As such, when the respective SIP proxies receive the FLOW PARAMETERS messages, the SIP proxies can validate that the FLOW PARAMETERS messages are from the legitimate user nodes (e.g., mobile stations) by decrypting the FLOW PARAMETERS messages. The firewall-controlled proxies can then forward the decrypted FLOW PARAMETERS messages to the respective firewalls or, if the firewalls also have access to the shared session key, forward the encrypted FLOW PARAMETERS messages to the respective firewalls.

In addition to encrypting the FLOW PARAMETERS messages 64a, 64b to validate that the FLOW PARAMETERS messages are from the legitimate user nodes 12a, 12b, it may be desirable to further validate that the pinholes created are for legitimate calls or sessions. In this regard, the FLOW PARAMETERS messages may further include a respective session identifier, unique to the communication session setup between the user nodes and known to the respective firewall-controlled proxies 24a, 24b. For example, during initiation of the communication between the user nodes, the session identifiers may be created, such as by the respective user nodes, and thereafter stored by the respective firewall-controlled proxies. The respective firewall-controlled proxies can then maintain a table of session identifiers for all ongoing sessions of media flow through the respective firewalls 22a, 22b. The session identifiers include any of a number of different pieces of information to uniquely identify the respective sessions. According to SIP, for example, the session identifiers can comprise a triplet of the from, to, and call-ID parameters corresponding to the particular call dialog.

To validate that the pinholes are created for legitimate sessions, then, the firewall-controlled proxies 24a, 24b can compare the session identifiers with the payloads of the FLOW PARAMETERS messages 64a, 64b to determine whether the session parameters identified in the FLOW PARAMETERS messages are associated with a legitimate session. In addition, the firewall-controlled proxies can determine whether pinholes in the respective firewalls 22a, 22b have previously been created. For example, the firewall-controlled proxies can determine whether pinholes have previously been created by flagging respective session identifiers in the tables of session identifiers when the pinholes are created. Then, if the session exists and no pinholes have previously been created, the firewall-controlled proxies will forward the FLOW PARAMETERS messages to the respective firewalls to thereby create the respective pinholes. Otherwise, if the session does not exist, or if pinholes have already been created for the respective session, the request for the creation of pinholes is deemed unauthorized and is typically dropped by the respective firewall-controlled proxies.

Presume, then, that the creation of pinholes is authorized, and thereafter created by the respective firewalls 22a, 22b. Thereafter, the user nodes 12a, 12b can communicate with one another, such as by transmitting media content back and forth between the user nodes. As shown, for example, the UAC 16a of user node 12a may transmit media content to the UAS 18b of user node 12b. With the creation of the pinholes, however, the communications can be passed between the respective user nodes without interference from the firewalls to determine whether to pass the content to the destination port of the respective user node.

Once the user nodes 12a, 12b have concluded the communication session, the communication session can be closed in any of a number of different manners. For example, one of the user nodes can end the communication session by sending a signaling message, such as a SIP BYE message, to the other user node via SIP proxies 20a, 20b and firewall-controlled proxies 24a, 24b. In this regard, the proxies have knowledge of the conclusion of the communication session. As such, with the conclusion of the communication session, the firewall-controlled proxies can direct the respective firewalls 22a, 22b to close the respective pinholes. The firewall-controlled proxies can direct the respective firewalls to close the respective pinholes in a number of different manners. For example, the firewall-controlled proxies can retrieve the flow parameters (source/destination IP and port) from memory based on the unique session identifier, and thereafter direct the respective firewalls to close the respective pinholes based upon the flow parameters. In this manner, the user nodes need not send a separate message to the proxies to close the pinholes.

Additionally, or alternatively, the firewalls 22a, 22b can be configured to close pinholes that have been in-active for a predefined period of time. In this regard, each pinhole may have an associated time-out period. Thus, for example, when one user node 12a, 12b drops the connection (e.g., accidentally powers off), the firewalls can close the associated pinholes after the time-out period.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   initiating a communication session between a protected node and a outside node, wherein initiating the communication session includes receiving, at the protected node, flow parameters regarding the communication session; and sending at least a portion of the flow parameters from the protected node to a firewall disposed along a communications path between the protected node and the outside node, wherein sending at least a portion of the flow parameters includes sending at least a portion of the flow parameters to a firewall-controlled proxy that includes an address associated with the firewall, wherein sending at least a portion of the flow parameters to a firewall-controlled proxy occurs after receiving the flow parameters at the protected node, and includes sending at least a portion of the flow parameters to a firewall-controlled proxy such that the firewall-controlled proxy sends at least a portion of the flow parameters to the firewall based upon the address of the firewall, and such that the firewall thereafter creates the at least one pinhole in the firewall based upon the portion of the flow parameters sent thereto, the at least one pinhole being created to thereby permit the transmission of information between the outside node and the protected node during the communication session.

2. A method according to claim 1, wherein receiving flow parameters includes receiving an address and at least one port associated with the outside node, and wherein sending at least a portion of the flow parameters comprises sending at least a portion of the flow parameters including the address and the at least one port associated with the outside node, and including an address and at least one port associated with the protected node.

3. A method according to claim 1, wherein sending at least a portion of the flow parameters to a firewall-controlled proxy comprises:

encrypting at least a portion of the flow parameters; and sending the encrypted portion of the flow parameters to the firewall-controlled proxy such that the firewall-controlled proxy decrypts the portion of the flow parameters to thereby validate the portion of the flow parameters.

4. A method according to claim 1, wherein initiating a communications session further includes creating a session identifier, the session identifier being created such that the firewall-controlled proxy compares at least a portion of the flow parameters with the session identifier to thereby validate the communication session before sending the portion of the flow parameters to the firewall.

5. A method according to claim 1, wherein initiating a communication session includes sending a session initiation protocol (SIP) INVITE request message to the outside node, and thereafter receiving a SIP 200 OK response message from the outside node.

6. A communications system comprising:

a protected node configured to initiate a communication session with an outside node, wherein the protected node is configured to receive flow parameters regarding the communication session during initiation of the communication session;

a firewall disposed along a communications path between the protected node and the outside node, wherein the firewall is configured to control transmission of information between the outside node and the protected node during the communication session; and a firewall-controlled proxy disposed between the protected node and the firewall, wherein the protected node is configured to send at least a portion of the flow parameters to the firewall-controlled proxy after the protected node receives the respective at least a portion of the flow parameters, wherein the firewall-controlled proxy is configured to send the portion of the flow parameters to the firewall based upon an address of the firewall such that the firewall thereafter creates at least one pinhole based upon the portion of the flow parameters to thereby permit the transmission of information between the outside node and the protected node during the communication session.

7. A communications system according to claim 6, wherein the protected node is configured to receive flow parameters including an address and at least one port associated with the outside node as the communication session is setup, and wherein the protected node is configured to send the firewall-controlled proxy at least a portion of the flow parameters comprising the address and the at least one port associated with the outside node and an address and at least one port associated with the protected node.

8. A communications system according to claim 6, wherein the protected node is configured to encrypt at least a portion of the flow parameters, and thereafter send the encrypted portion of the flow parameters to the firewall-controlled proxy, and wherein the firewall-controlled proxy is configured to decrypt the portion of the flow parameters to thereby validate the portion of the flow parameters.

9. A communications system according to claim 6, wherein the protected node is configured to create a session identifier as the communication session is setup, and wherein the firewall-controlled proxy is configured to compare at least a portion of the flow parameters with the session identifier to thereby validate the communication session before sending the portion of the flow parameters to the firewall.

10. A communications system according to claim 6, wherein the protected node is configured to send a session initiation protocol (SIP) INVITE request message to the outside node to thereby initiate the communication session, and wherein the protected node is thereafter configured to receive a SIP 200 OK response message from the outside node.

11. An apparatus comprising:

a controller configured to initiate a communication session with an outside node, wherein the controller being configured to initiate the communication session includes the controller being configured to receive flow parameters regarding the communication session, wherein the controller is configured to send at least a portion of the flow parameters to a firewall disposed along a communications path between the apparatus and an outside node, wherein the controller being configured to send at least a portion of the flow parameters includes the controller being configured to send at least a portion of the flow parameters after receiving the flow parameters, and to a firewall-controlled proxy that includes an address associated with the firewall, and wherein the controller is configured to send at least a portion of the flow parameters to the firewall-controlled proxy such that the firewall-controlled proxy sends at least a portion of the flow parameters to the firewall based upon the address of the firewall, and such that the firewall thereafter creates at least one pinhole based upon the portion of the flow parameters sent thereto, the at least one pinhole being created to thereby permit the transmission of information between the outside node and the apparatus during the communication session.

12. An apparatus according to claim 11, wherein the controller is configured to receive flow parameters including an address and at least one port associated with the outside node as the communication session is setup, and wherein the controller is configured to send at least a portion of the flow parameters including the address and the at least one port associated with the outside node, and including an address and at least one port associated with the apparatus.

13. An apparatus according to claim 11, wherein the controller is configured to encrypt at least a portion of the flow parameters, and thereafter send the encrypted portion of the flow parameters to the firewall-controlled proxy such that the firewall-controlled proxy decrypts the portion of the flow parameters to thereby validate the portion of the flow parameters.

14. An apparatus according to claim 11, wherein the controller being configured to initiate the communication session further includes the controller being configured to create a session identifier, the controller being configured to create the session identifier such that the firewall-controlled proxy compares at least a portion of the flow parameters with the session identifier to thereby validate the communication session before sending the portion of the flow parameters to the firewall.

15. An apparatus according to claim 11, wherein the controller is configured to send a session initiation protocol (SIP) INVITE request message to the outside node to thereby initiate the communication session, and wherein the controller is thereafter configured to receive a SIP 200 OK response message from the outside node.

16. A method comprising:
receiving flow parameters at a firewall-controlled proxy from a protected node, the firewall-controlled proxy including an address associated with a firewall disposed along a communications path between the protected node and an outside node, the flow parameters including flow parameters for a communication session between the protected node and the outside node, and having been previously received by the protected node during initiation of the communication session; and
sending at least a portion of the flow parameters to the firewall from the firewall-controlling proxy based upon the address of the firewall, the portion of the parameters being sent to the firewall such that the firewall thereafter creates the at least one pinhole in the firewall based upon the portion of the flow parameters sent thereto, the at least one pinhole being created to thereby permit the transmission of information between the outside node and the protected node during the communication session.

17. A method according to claim 16, wherein receiving flow parameters includes receiving an address and at least one port associated with the outside node, and wherein sending at least a portion of the flow parameters comprises sending at least a portion of the flow parameters including the address and the at least one port associated with the outside node, and including an address and at least one port associated with the protected node.

18. A method according to claim 16, wherein receiving flow parameters comprises:
receiving encrypted flow parameters from the protected node; and
decrypting the flow parameters to thereby validate the portion of the flow parameters.

19. A method according to claim 16 further comprising:
comparing at least a portion of the flow parameters with a session identifier to thereby validate the communication session before sending the portion of the flow parameters to the firewall, the session identifier having been created by the protected node.

20. An apparatus comprising:
a processor configured to receive flow parameters from a protected node, the apparatus including an address associated with a firewall disposed along a communications path between the protected node and an outside node, the flow parameters including flow parameters for a communication session between the protected node and the outside node, and having been previously received by the protected node during initiation of the communication session,
wherein the processor is configured to send at least a portion of the flow parameters to the firewall based upon the address of the firewall, the portion of the parameters being sent to the firewall such that the firewall thereafter creates the at least one pinhole in the firewall based upon the portion of the flow parameters sent thereto, the at least one pinhole being created to thereby permit the transmission of information between the outside node and the protected node during the communication session.

21. An apparatus according to claim 20, wherein the processor is configured to receive flow parameters including an address and at least one port associated with the outside node, and wherein the processor is configured to send at least a portion of the flow parameters including the address and the at least one port associated with the outside node, and including an address and at least one port associated with the protected node.

22. An apparatus according to claim 20, wherein the processor being configured to receive flow parameters includes the processor being configured to receive encrypted flow parameters from the protected node, and decrypting the flow parameters to thereby validate the portion of the flow parameters.

23. An apparatus according to claim 20, wherein the processor is further configured to compare at least a portion of the flow parameters with a session identifier to thereby validate the communication session before sending the portion of the flow parameters to the firewall, the session identifier having been created by the protected node.

* * * * *

UNITED STATES PATENT AND TRADEMARK OFFICE
CERTIFICATE OF CORRECTION

PATENT NO. : 7,340,771 B2 Page 1 of 1
APPLICATION NO. : 10/461312
DATED : March 4, 2008
INVENTOR(S) : Chan et al.

It is certified that error appears in the above-identified patent and that said Letters Patent is hereby corrected as shown below:

<u>Column 1,</u>

Line 63, "modem" should read --modern--.

<u>Column 4,</u>

Line 1, "exchange" should read --eXchange--.

<u>Column 13,</u>

Line 40, "firewall-controlling" should read --firewall-controlled--.

Signed and Sealed this

Twelfth Day of August, 2008

JON W. DUDAS
*Director of the United States Patent and Trademark Office*